United States Patent
Sugimura et al.

(10) Patent No.: US 10,894,549 B2
(45) Date of Patent: Jan. 19, 2021

(54) VEHICLE, VEHICLE CONTROL METHOD, AND COMPUTER-READABLE RECORDING MEDIUM

(71) Applicant: TOYOTA JIDOSHA KABUSHIKI KAISHA, Toyota (JP)

(72) Inventors: Tae Sugimura, Miyoshi (JP); Hirotaka Karube, Toyota (JP); Kazuki Matsumoto, Ohgaki (JP); Makoto Mori, Nagakute (JP); Jun Kondo, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/560,251

(22) Filed: Sep. 4, 2019

(65) Prior Publication Data
US 2020/0114934 A1    Apr. 16, 2020

(30) Foreign Application Priority Data
Oct. 15, 2018 (JP) ................. 2018-194548

(51) Int. Cl.
*B60W 50/14* (2020.01)
*H04W 4/90* (2018.01)
*G08G 1/0965* (2006.01)

(52) U.S. Cl.
CPC ........... *B60W 50/14* (2013.01); *G08G 1/0965* (2013.01); *H04W 4/90* (2018.02); *B60W 2050/143* (2013.01)

(58) Field of Classification Search
CPC ............ G08G 1/09685; G08G 1/0965; G01C 21/3697; B60W 50/14; B60W 2050/143; H04W 4/90
See application file for complete search history.

(56) References Cited

U.S. PATENT DOCUMENTS

| | | | | |
|---|---|---|---|---|
| 4,727,567 A | * | 2/1988 | Angelini | H04Q 3/625 345/30 |
| 7,676,372 B1 | * | 3/2010 | Oba | G09B 21/009 434/169 |
| 8,094,788 B1 | * | 1/2012 | Eberle | G06Q 10/10 379/88.12 |
| 8,130,918 B1 | * | 3/2012 | Zirngibl | H04M 3/42153 379/69 |
| 2004/0128353 A1 | * | 7/2004 | Goodman | H04L 51/04 709/204 |
| 2005/0080626 A1 | * | 4/2005 | Marumoto | G10L 13/02 704/269 |

(Continued)

FOREIGN PATENT DOCUMENTS

| | | |
|---|---|---|
| CN | 101416225 A | 4/2009 |
| JP | 2000-101526 A | 4/2000 |

(Continued)

*Primary Examiner* — Hoi C Lau
(74) *Attorney, Agent, or Firm* — Oliff PLC

(57) ABSTRACT

A vehicle includes a receiving part configured to receive an emergency signal, an alert control part configured to determine a speech speed of an emergency alert based on current position information of the vehicle and map information of surroundings of the vehicle when the emergency signal is received by the receiving part, and an output part configured to output the emergency alert using the speech speed determined by the alert control part.

9 Claims, 8 Drawing Sheets

(56) References Cited

U.S. PATENT DOCUMENTS

| | | | | |
|---|---|---|---|---|
| 2007/0192910 A1* | 8/2007 | Vu | ............... | G05D 1/021 |
| | | | | 700/245 |
| 2009/0112582 A1* | 4/2009 | Kuwagaki | ............. | G08G 1/09685 |
| | | | | 704/225 |
| 2011/0109543 A1* | 5/2011 | Das | ............... | G06F 3/04845 |
| | | | | 345/156 |
| 2011/0136548 A1* | 6/2011 | Sakai | ............... | G01C 21/3697 |
| | | | | 455/569.2 |
| 2014/0306833 A1* | 10/2014 | Ricci | ............... | H04W 36/0005 |
| | | | | 340/901 |
| 2014/0309789 A1* | 10/2014 | Ricci | ............... | G06F 3/017 |
| | | | | 700/276 |
| 2014/0309864 A1* | 10/2014 | Ricci | ............... | G05D 23/1917 |
| | | | | 701/36 |
| 2015/0195693 A1* | 7/2015 | Hooriani | ............. | H04W 4/027 |
| | | | | 455/404.2 |
| 2017/0234691 A1* | 8/2017 | Abramson | ......... | G01C 21/3484 |
| | | | | 701/442 |
| 2017/0295482 A1* | 10/2017 | Khan | ............... | H04W 4/14 |
| 2018/0061221 A1* | 3/2018 | He | ............... | A61B 5/45 |
| 2018/0277117 A1* | 9/2018 | Hergenroeder | ......... | G09B 5/04 |
| 2019/0180871 A1* | 6/2019 | Doerflinger | ............. | G06F 40/30 |
| 2019/0197430 A1* | 6/2019 | Arditi | ............... | G06N 20/00 |
| 2020/0114934 A1* | 4/2020 | Sugimura | ............. | B60W 50/14 |

FOREIGN PATENT DOCUMENTS

| | | |
|---|---|---|
| JP | 2013-069130 A | 4/2013 |
| JP | 2016-188003 A | 11/2016 |
| JP | 2018-022392 A | 2/2018 |
| JP | 2018-124763 A | 8/2018 |

\* cited by examiner

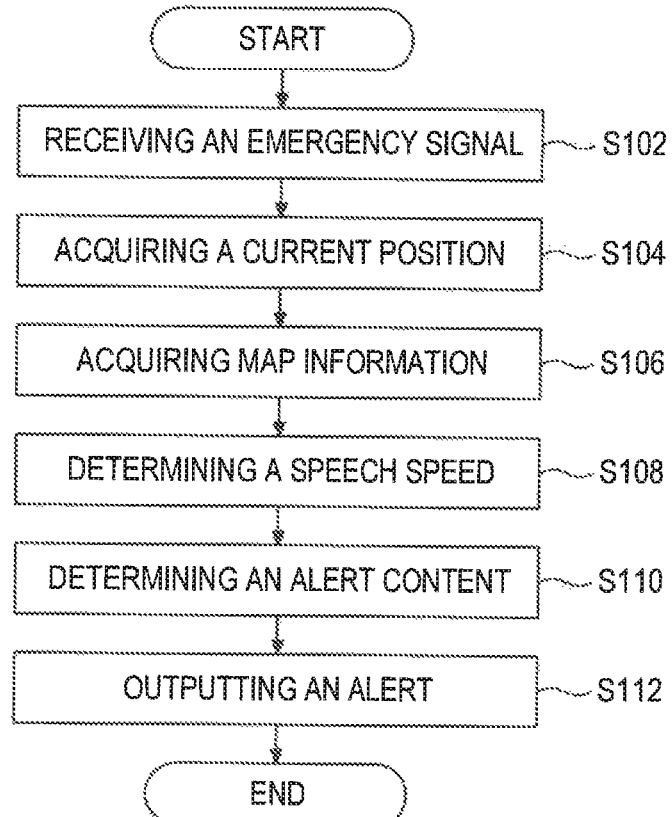

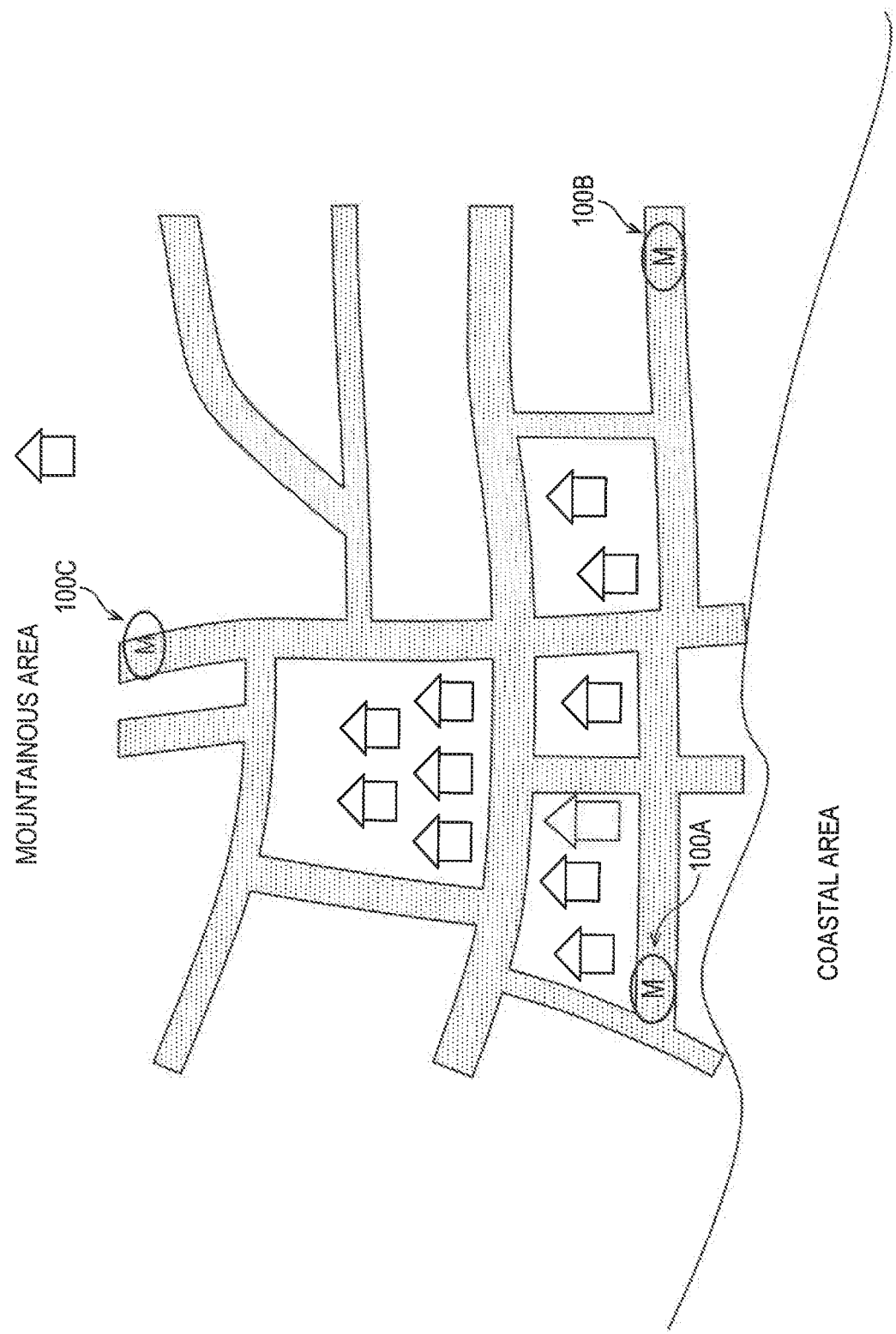

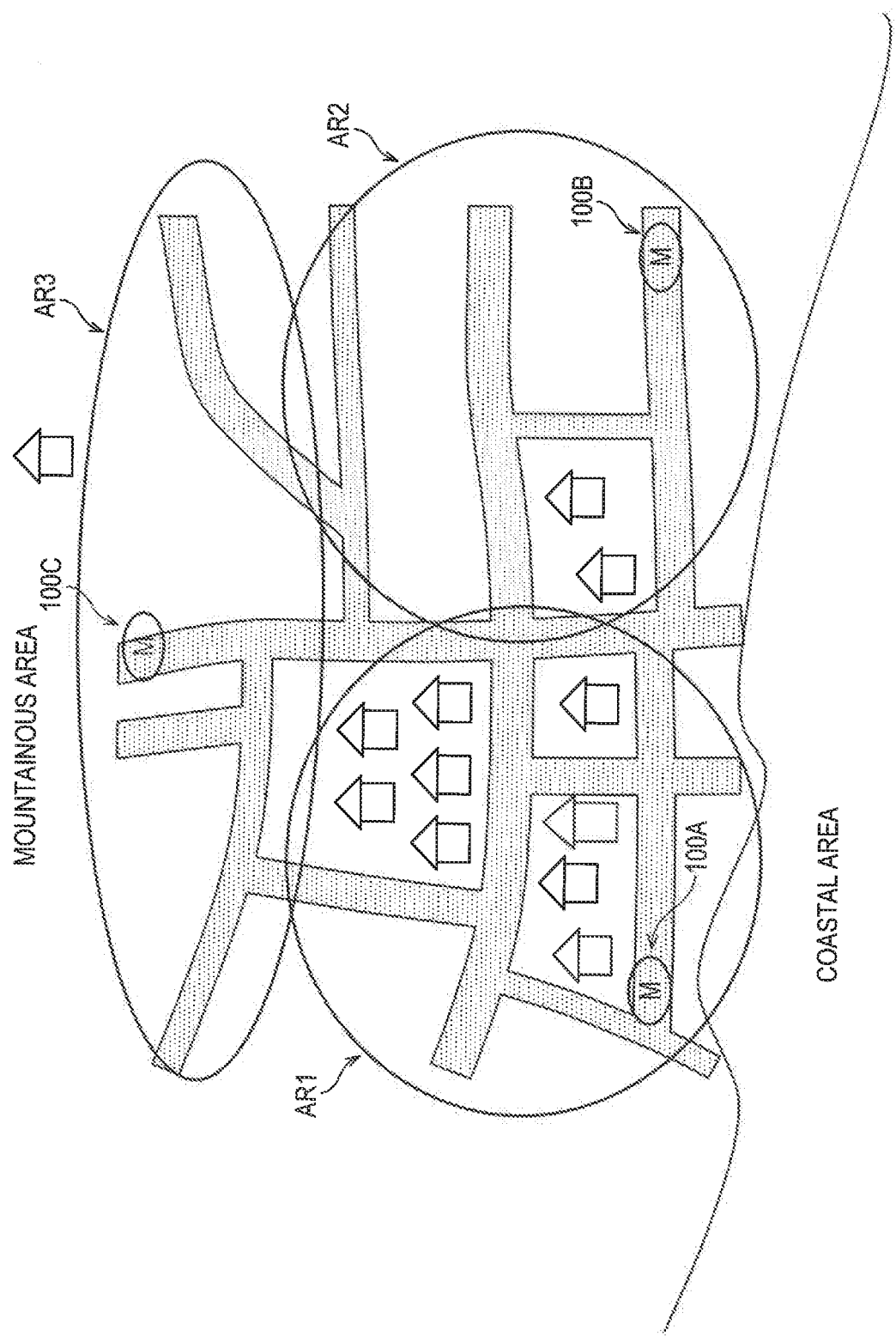

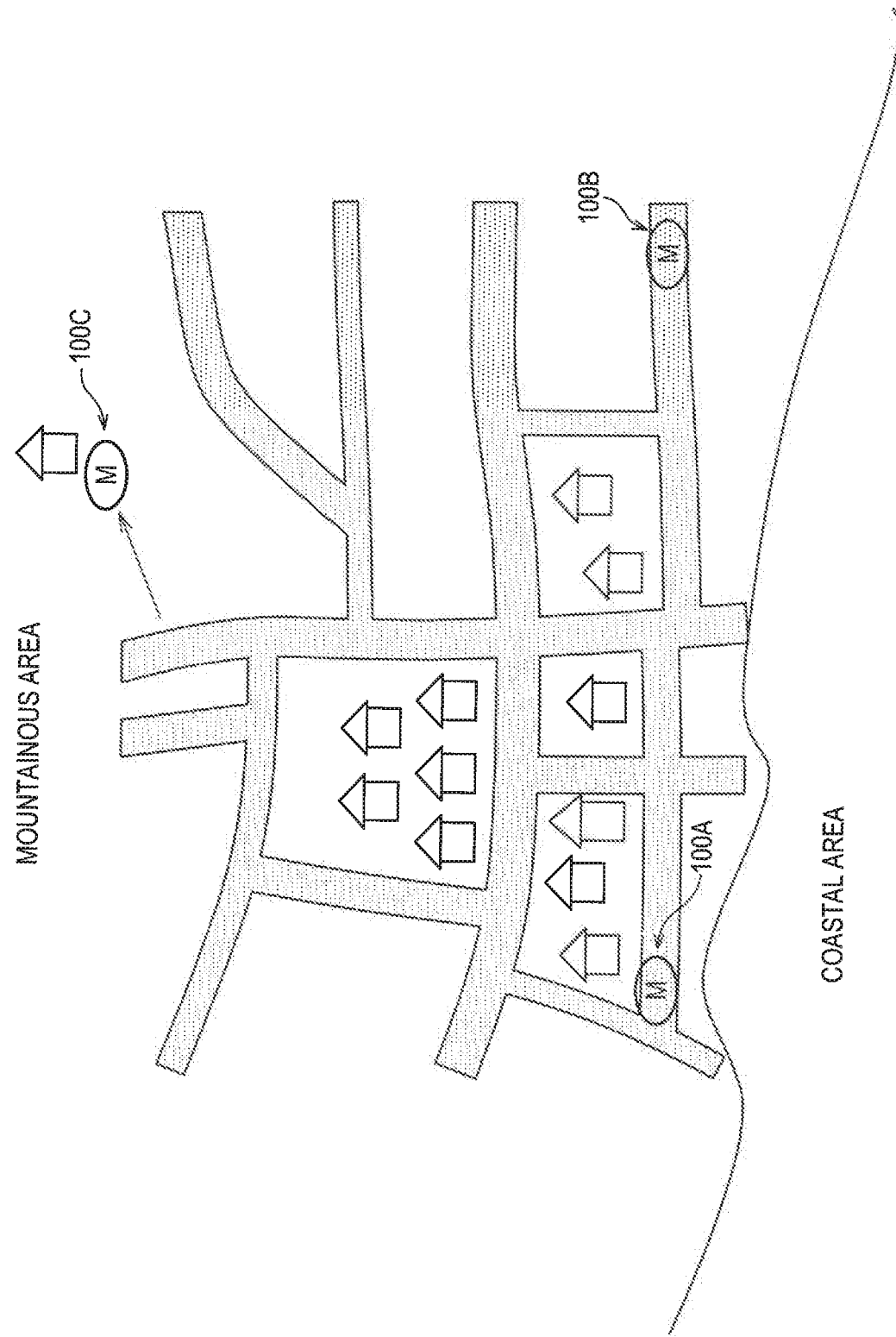

VEHICLE, VEHICLE CONTROL METHOD, AND COMPUTER-READABLE RECORDING MEDIUM

INCORPORATION BY REFERENCE

The disclosure of Japanese Patent Application No. 2018-194548 filed on Oct. 15, 2018 including the specification, drawings and abstract is incorporated herein by reference in its entirety.

BACKGROUND

1. Technical Field

The disclosure relates to a vehicle, a vehicle control method, and a computer-readable recording medium.

2. Description of Related Art

In recent years, a technique has been developed in which a vehicle receives an urgent newsflash such as an urgent earthquake newsflash or the like and notifies an emergency alert using an internal or external speaker (for example, Japanese Unexamined Patent Application Publication No. 2018-022392 (JP 2018-022392 A)). In addition, there is available a technique of monitoring the number of viewers gathered around a robot and evaluating the contents (for example, Japanese Unexamined Patent Application Publication No. 2016-188003 (JP 2016-188003 A)).

SUMMARY

However, when notifying an emergency alert, there is a need to control the emergency alert according to the purpose of notifying the alert and the current position. For example, when it is desired to notify an alert over a wide area, the alert is notified at a slow voice speed. When it is desired to notify an alert over a narrow area, the alert is notified at a high voice speed to increase urgency.

The disclosure provides a vehicle and a vehicle control method capable of controlling the speech speed of an emergency alert, and a computer-readable recording medium.

A vehicle according to the first aspect of the disclosure includes a receiving part configured to receive an emergency signal, an alert control part configured to determine a speech speed of an emergency alert based on current position information of the vehicle and map information of surroundings of the vehicle when the emergency signal is received by the receiving part, and an output part configured to output the emergency alert using the speech speed determined by the alert control part.

A vehicle control method according to the second aspect of the disclosure includes: receiving an emergency signal; determining a speech speed of an emergency alert based on current position information of a vehicle and map information of surroundings of the vehicle when the emergency signal is received; and outputting the emergency alert using the speech speed.

The third aspect of the disclosure is a computer-readable recording medium storing a program executed by a vehicle. The program causes the vehicle to execute: receiving an emergency signal; determining a speech speed of an emergency alert based on current position information of the vehicle and map information of surroundings of the vehicle when the emergency signal is received; and outputting the emergency alert using the speech speed.

With the technique of the disclosure, it is possible to control the speech speed of an emergency alert.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a view showing an example of speech speed determination information;

FIG. 7 is a view showing an example of alert content determination information;

FIG. 8 is a flowchart showing an example of a process performed by a small vehicle according to the present embodiment;

FIG. 9 is a view for illustrating specific example 1 according to the present embodiment;

FIG. 10 is a view for illustrating specific example 2 according to the present embodiment; and FIG. 11 is a view for illustrating specific example 3 according to the present embodiment.

DETAILED DESCRIPTION OF EMBODIMENTS

Figure 1:
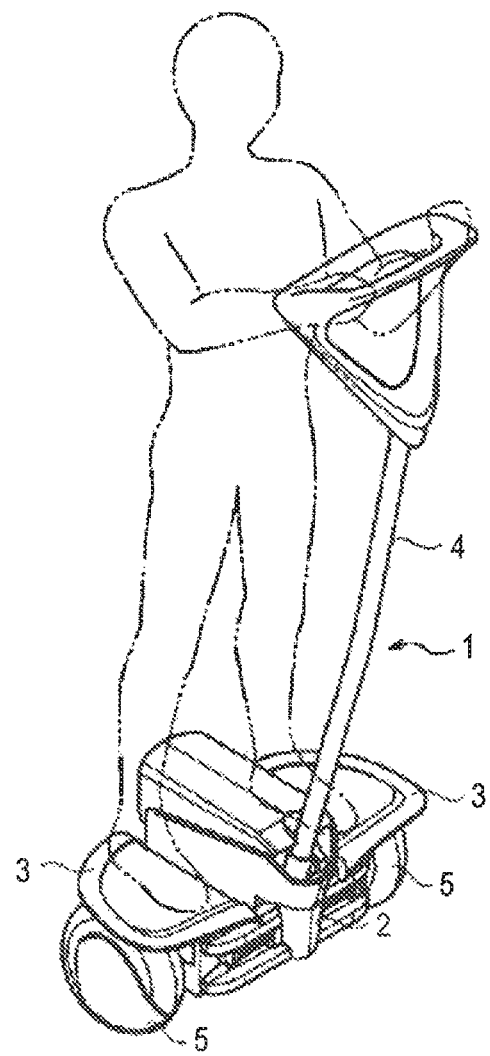
FIG. 1 is a perspective view showing a schematic configuration of an inverted mobile body according to the present embodiment.

Hereinafter, embodiments of the disclosure will be described in detail with reference to the drawings. In addition, the same elements will be designated by like reference numerals, and the redundant description thereof will be omitted.

In the present embodiment, when a vehicle receives an emergency signal, the speech speed of an emergency alert is controlled based on the current position of the vehicle and the map information of the surroundings. In addition, the vehicle may change the content of the emergency alert based on the current position and the map information of the surroundings.

Configuration

FIG. 1 is a perspective view showing a schematic configuration of an inverted mobile body according to the present embodiment. The inverted mobile body 1 according to the present embodiment includes, for example, a vehicle body 2, a pair of left and right step portions 3 attached to the vehicle body 2 and stepped on by a rider, an operation handle 4 attached to the vehicle body 2 in a tiltable manner and gripped by the rider, and a pair of left and right drive wheels 5 rotatably attached to the vehicle body 2.

The inverted mobile body 1 according to the present embodiment is configured as, for example, a coaxial two-wheeled vehicle which includes coaxially-arranged drive wheels 5 and travels while maintaining an inverted state. The inverted mobile body 1 is configured such that the inverted mobile body 1 is moved forward and backward by moving the center of gravity of the rider back and forth and tilting the respective step portions 3 of the vehicle body 2 forward and backward, and such that the inverted mobile body 1 is turned to the left side or the right side by moving the center of gravity of the rider to the left side or the right side and tilting the step portions 3 of the vehicle body 2 to the left side or the right side. Although the above-mentioned coaxial two-wheeled vehicle is applied as the inverted mobile body 1, the disclosure is not limited thereto but may be applied to any mobile body capable of traveling while maintaining an inverted state.

Figure 2:
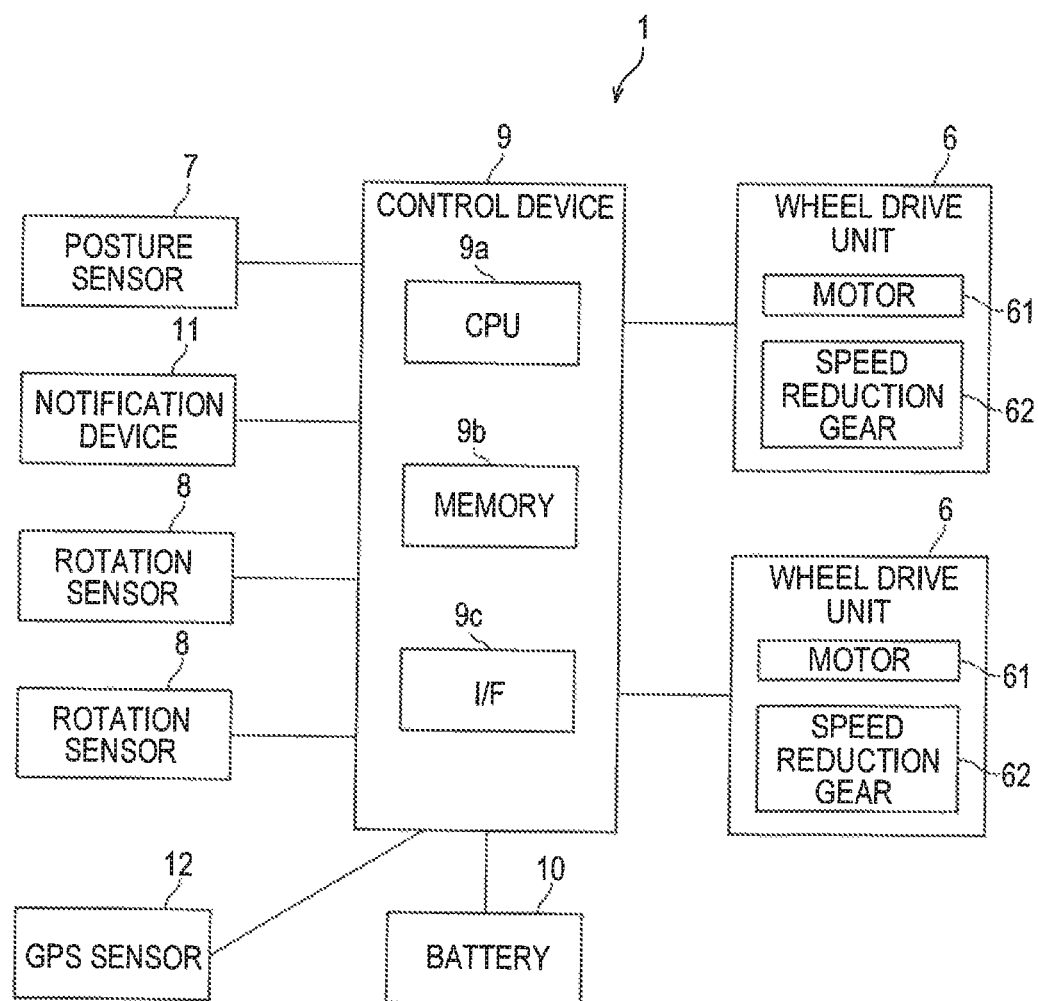
FIG. 2 is a block diagram showing a schematic system configuration of the inverted mobile body according to the present embodiment.

FIG. 2 is a block diagram showing a schematic system configuration of the inverted mobile body according to the present embodiment. The inverted mobile body 1 according to the present embodiment includes a pair of wheel drive units 6 configured to drive the respective drive wheels 5, a posture sensor 7 configured to detect the posture of the vehicle body 2, a pair of rotation sensors 8 configured to detect rotation information of the respective drive wheels 5, a control device 9 configured to control the respective wheel drive units 6, a battery 10 configured to supply electric power to the wheel drive units 6 and the control device 9, a notification device 11 capable of outputting a sound, and a GPS sensor 12 configured to detect position information.

The respective wheel drive units 6 are built in the vehicle body 2 and are configured to drive the left and right drive wheels 5, respectively. The respective wheel drive units 6 may rotationally drive the drive wheels 5 independently of each other. Each of the wheel drive units 6 may be configured by, for example, a motor 61 and a speed reduction gear 62 coupled to a rotation shaft of the motor 61 so as to be able to transmit power.

The posture sensor 7 is provided in the vehicle body 2 to detect and output posture information of the vehicle body 2, the operation handle 4 and the like. The posture sensor 7 is configured to detect posture information of the inverted mobile body 1 during the travel thereof and is configured by, for example, a gyro sensor, an acceleration sensor or the like. When the rider tilts the operation handle 4 forward or backward, the step portions 3 are tilted in the same direction. The posture sensor 7 detects posture information corresponding to such tilt. The posture sensor 7 outputs the detected posture information to the control device 9.

Each rotation sensor 8 is provided on each of the drive wheels 5 and can detect rotation information such as a rotation angle, a rotation angular velocity, a rotation angular acceleration and the like of each of the drive wheels 5. Each rotation sensor 8 is configured by, for example, a rotary encoder, a resolver or the like. Each rotation sensor 8 outputs the detected rotation information to the control device 9.

The battery 10 is built in, for example, the vehicle body 2, and is configured by a lithium ion battery or the like. The battery 10 supplies electric power to the respective wheel drive units 6, the control device 9 and other electronic devices.

The control device 9 generates and outputs control signals for driving and controlling the respective wheel drive units 6 based on detection values output from various sensors mounted on the inverted mobile body 1. The control device 9 executes predetermined arithmetic processing based on, for example, the posture information output from the posture sensor 7, the rotation information of each drive wheel 5 output from each rotation sensor 8, and the like, and outputs necessary control signals to the respective wheel drive units 6. The control device 9 controls the wheel drive units 6 to execute, for example, inversion control for maintaining the inverted state of the inverted mobile body 1.

The control device 9 includes a CPU 9a, a memory 9b and an interface (I/F) 9c in order to realize the above-described process. The CPU 9a executes functions and/or methods implemented by codes or instructions included in a program stored in the memory 9b.

The memory 9b stores a program and provides a work area to the CPU 9a. The memory 9b also temporarily stores various kinds of data generated while the CPU 9a is executing a program. The memory 9b includes, for example, a random access memory (RAM), a read only memory (ROM) and the like.

The I/F 9c includes an input device for inputting various operations to the control device 9 and an output device for outputting the processing result processed by the control device 9.

The notification device 11 is one specific example of a notification means. The notification device 11 notifies predetermined information to a rider or a person outside the vehicle in response to a notification signal from the control device 9. The notification device 11 is configured by, for example, a speaker that outputs a sound.

The GPS sensor 12 acquires current position information of the inverted mobile body 1. The GPS sensor 12 is, for example, a part of a position information measurement system using artificial satellites. By receiving radio waves from a large number of GPS satellites, the GPS sensor 12 accurately measures the position (the longitude, the latitude and the altitude) of the inverted mobile body 1 at any point on the earth. In addition, the inverted mobile body 1 may be provided with an imaging device or a communication device.

Figure 3:
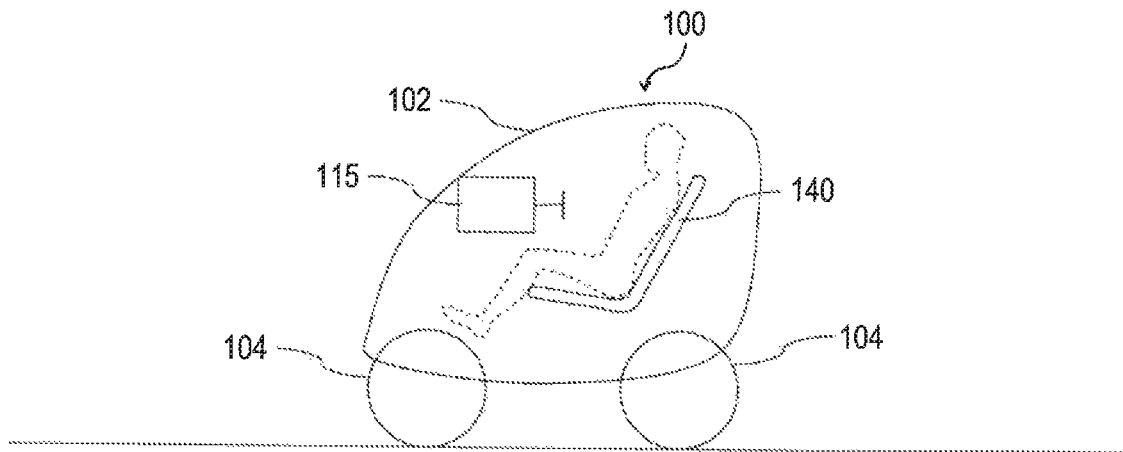
FIG. 3 is a view showing a schematic configuration of a personal mobile body according to the present embodiment.

FIG. 3 is a view showing a schematic configuration of a personal mobile body according to the present embodiment. The personal mobile body 100 according to the present embodiment includes, for example, a vehicle body 102, a seat unit 140 attached to the vehicle body 102 so that a rider (driver) sits on the seat unit 140, an operation unit 115 grasped by the rider and configured to enable the rider to drive the personal mobile body 100 and a pair of left and right drive wheels 104 rotatably attached to the vehicle body 102.

The personal mobile body 100 according to the present embodiment is, for example, a small vehicle for one person or two persons. Two wheels 104 may be provided at the front and one wheel 104 may be provided at the rear. The personal mobile body 100 may be operated by the driver so that the movement thereof can be controlled. Alternatively, by switching the personal mobile body 100 to an autonomous traveling mode, the autonomous traveling of the personal mobile body 100 may be controlled based on an image captured by an imaging device 170 and a large number of sensors.

Figure 4:
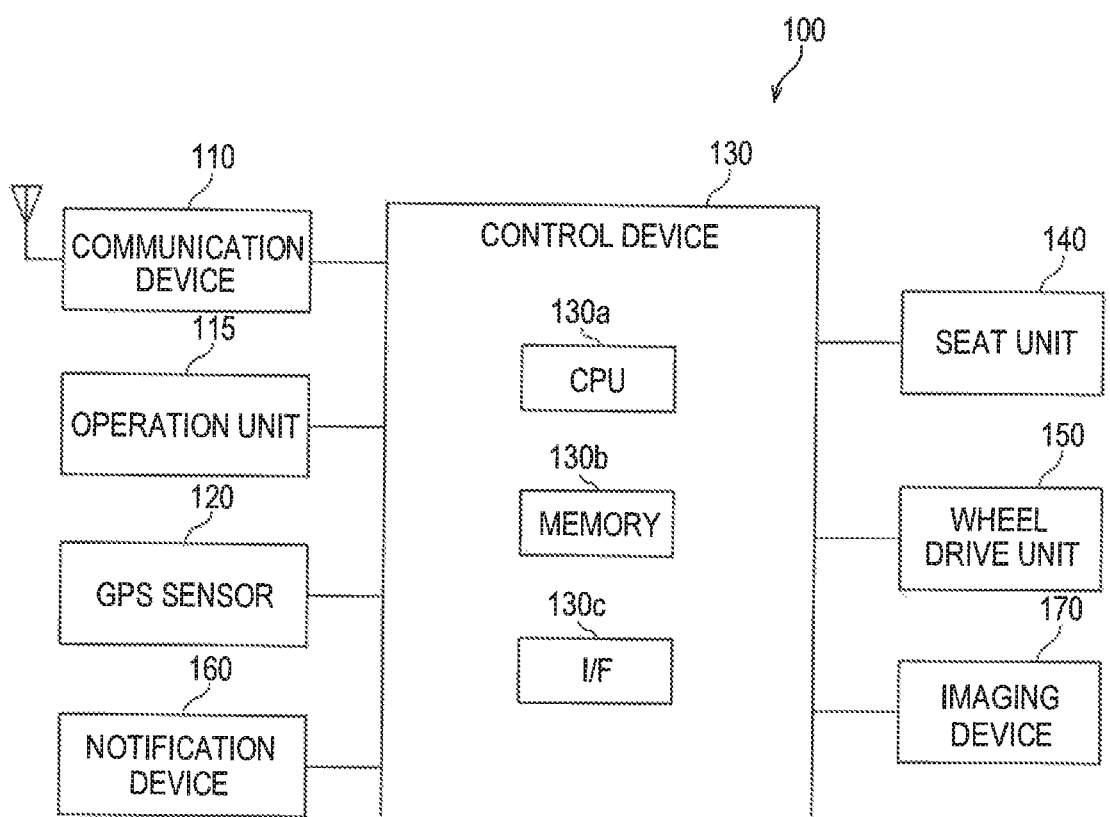
FIG. 4 is a block diagram showing a schematic system configuration of the personal mobile body according to the present embodiment.

FIG. 4 is a block diagram showing a schematic system configuration of the personal mobile body according to the present embodiment. The personal mobile body 100 according to the present embodiment includes a pair of wheel drive units 150 configured to drive the respective drive wheels 104, a seat unit 140 on which a rider can sit, a communication device 110 configured to make communication with an external device, an operation unit 115 configured to enable the rider to perform a driving operation, a GPS sensor 120 configured to acquire position information, a notification device 160 configured to output a sound, and an imaging device 170 configured to capture an image.

The GPS sensor 120 acquires current position information of the personal mobile body 100. The GPS sensor 120 is, for example, a part of a position information measurement system using artificial satellites. By receiving radio waves from a large number of GPS satellites, the GPS sensor 120 accurately measures the position (the longitude, the latitude and the altitude) of the personal mobile body 100 at any point on the earth.

A control device 130 generates and outputs a control signal for driving and controlling each wheel drive unit 150 based on the detection values of various sensors mounted on the personal mobile body 100 and the content of an operation performed by the rider using the operation unit 115.

The control device 130 includes a CPU 130a, a memory 130b and an I/F 130c in order to realize various processes. The CPU 130a executes functions and/or methods implemented by codes or instructions included in a program stored in the memory 130b.

The memory 130b stores a program and provides a work area to the CPU 130a. The memory 130b also temporarily stores various kinds of data generated while the CPU 130a is executing a program. The memory 130b includes, for example, a random access memory (RAM), a read only memory (ROM) and the like.

The I/F 130c includes an input device for inputting various operations to the control device 130 and an output device for outputting the processing result processed by the control device 130.

The seat unit 140 is a seat unit on which the rider can sit, and may be configured to be capable of reclining.

Each wheel drive unit 150 is built in the vehicle body 102 and is configured to drive a pair of left and right drive wheels 104 or one rear drive wheel 104.

The notification device 160 is one specific example of a notification means. The notification device 160 notifies predetermined information to a rider or a person outside the vehicle in response to a notification signal from the control device 130. The notification device 160 is configured by, for example, a speaker that outputs a sound.

The imaging device 170 is provided, for example, at a position for imaging scenes in front of the personal mobile body 100. The imaging device 170 outputs a captured image, which is obtained by imaging the scenes in front of the personal mobile body 100, to the control device 130.

Functional Configuration

Figure 5:
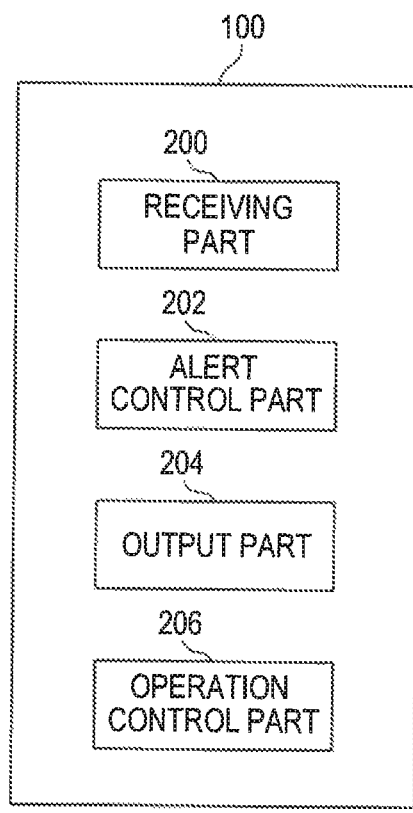
FIG. 5 is a block diagram showing a functional configuration of the personal mobile body according to the present embodiment.

FIG. 5 is a block diagram showing a functional configuration of the personal mobile body 100 according to the present embodiment. The personal mobile body 100 shown in FIG. 5 includes a receiving part 200, an alert control part 202, an output part 204 and an operation control part 206. Although the functions shown in FIG. 5 may be provided to the inverted mobile body 1, the personal mobile body 100 will be described below as an example. In addition, the inverted mobile body 1 and the personal mobile body 100 are collectively referred to as a small vehicle or a personal mobility.

For example, the receiving part 200 shown in FIG. 5 may be realized by the communication device 110 shown in FIG. 4, the alert control part 202 may be realized by the control device 130 shown in FIG. 4, and the output part 204 may be realized by the notification device 160 shown in FIG. 4.

The receiving part 200 receives an emergency signal transmitted from other devices. The emergency signal is, for example, a signal generated at the time of a disaster occurrence or a disaster prediction, such as an urgent earthquake newsflash, a typhoon newsflash, a heavy rainfall newsflash or the like. Other devices predict, for example, the occurrence of an earthquake or tsunami based on the information obtained from sensors such as a seismograph or the like, and may generate an emergency signal when it is predicted that a great deal of damage will occur. The prediction of emergency may be made by other devices. Alternatively, an operator may manually indicate the occurrence of emergency.

When the emergency signal is received by the receiving part 200, the alert control part 202 controls the speech speed of an emergency alert based on the current position information, the map information of the surroundings, and the like. The alert control part 202 can identify the current position information using the position information from the GPS sensor 120. In addition, the alert control part 202 can acquire the map information of the surroundings from a map application such as, for example, Google Map (registered trademark) or the like. Furthermore, when the personal mobile body 100 has a navigation function, the map information used by the navigation function may be acquired.

The output part 204 outputs an emergency alert using the speech speed determined by the alert control part 202. For example, the alert control part 202 may selectively use an alert of a fast speech speed and an alert of a slow speech speed. As a result, the small vehicle can output an emergency alert from a notification device such as a speaker or the like at an appropriate speech speed.

Furthermore, the alert control part 202 may determine the speech speed of the emergency alert based on the positional relationship between the current position indicated by the current position information and the residential area indicated by the map information of surroundings. As an example, the memory 130b may store speech speed determination information indicating the relationship between the place and the speech speed.

FIG. 6 is a view showing an example of the speech speed determination information. In the example shown in FIG. 6, the alert control part 202 determines the speech speed of the emergency alert to be a second speech speed when the place of the current position is a wide area, and the alert control part 202 determines the speech speed of the emergency alert to be a first speech speed when the place of current position is a narrow area. The second speech speed is slower than the first speech speed.

In the case of the above example, when the current position is not a residential area and the emergency alert is to be notified in a wide area, the alert control part 202 determines the speech speed to be a slow speech speed (the second speech speed) in order to appropriately notify the emergency alert to a distant place. On the other hand, when the current position is a residential area and the emergency alert is notified in a narrow area, the alert control part 202 determines the speech speed to be a fast speech speed (the first speech speed) in order to increase the urgency. As a result, the alert control part 202 may control the speech speed to be slow when it is desired to deliver the emergency alert to a distant place, and may control the speech speed to be fast when it is desired to notify the emergency alert in a near place with increased urgency.

The reason for making the speech speed slow in the case of wide area notification is that it is better to slowly output a voice at intervals in order to restrain voices from being overlapped many times due to reflection or resonance. On the other hand, the reason for making the speech speed fast in the case of narrow area notification is that since there are less reflection and resonance in a situation where people are present near than a situation where people are present far, people can appropriately hear the emergency alert even at fast speech speed and the urgency can be increased by making the speech speed fast.

Furthermore, the alert control part 202 may determine the speech speed to be the first speech speed when the current position is spaced apart by a distance smaller than a predetermined distance from the residential area, and may determine the speech speed to be the second speech speed slower than the first speech speed when the current position is spaced apart by a distance equal to or larger than the predetermined distance from the residential area. The predetermined distance may be, for example, 50 m or 100 m, but is not limited to these examples. More specifically, the alert control part 202 may specify the position of a house closest to the current position as a residential area. Therefore, the alert control part 202 can determine the wide area notification or the narrow area notification using a clear reference.

The alert control part 202 may change the content of the emergency alert based on the current position and the position of a mountainous area or a coastal area indicated by the map information of surroundings. As an example, the memory 130b may store alert content determination information indicating the relationship between the place and the alert content.

FIG. 7 is a view showing an example of the alert content determination information. In the example shown in FIG. 7, when the place of the current position is a mountainous area, the alert control part 202 determines the content of the emergency alert to be a first alert. when the place of the current position is a coastal area, the alert control part 202 determines the content of the emergency alert to be a second alert. For example, the first alert may be a content for notifying a danger of a landslide or the like, and the second alert may be a content for notifying a danger of a tsunami or the like.

In the case of the above example, the alert control part 202 performs control so that a danger of a landslide or the like (the first alert) is notified when the current position is close to a mountainous area (within a predetermined distance). In addition, the alert control part 202 performs control so that a danger of a tsunami or the like (the second alert) is notified when the current position is close to a coastal area (within a predetermined distance). As a result, the alert control part 202 can change the alert content according to the current position and the surrounding terrain.

Furthermore, the alert control part 202 may change the speech speed of the emergency alert based on the number of persons imaged by the imaging device 170. Although a known technique may be used to identify a person from the captured image, for example, it is possible to identify a person by image recognition of the shape of a person. For example, the alert control part 202 may determine the speech speed to be slow when the number of persons is zero in the captured image, and may determine the speech speed to be fast when the number of persons is at least one or more in the captured image. In addition, the alert control part 202 may control the speech speed to become faster as the number of persons in the captured image increases. In this case, an upper limit of the speech speed may be provided. This is because the emergency alert cannot be heard when the speech speed is too fast.

The alert control part 202 may determine a notification area of an emergency alert of each vehicle by performing information communication with another vehicle using the communication device 110. As a result, the same emergency alert can be notified in a predetermined area, and the alert content and the speech speed do not have to be changed frequently. This makes it possible to efficiently notify the emergency alert.

The operation control part 206 for enabling autonomous traveling specifies a village in a sparsely populated area based on map information and autonomously travels to the village. For example, the operation control part 206 has a function of following a route based on the images and the position information obtained from various sensors such as a range scanner sensor (not shown), an imaging device 170, a GPS sensor 120 and the like, and aiming at a decided destination while avoiding obstacles The output part 204 may output an emergency alert when the small vehicle arrives at the village. As a result, even if a person lives in an area to which a town broadcast or the like cannot reach, a small vehicle can be moved to the area to notify an emergency newsflash. In addition, since the vehicle is a small vehicle (or a personal mobility), even when there is no road, it is possible for the small vehicle to move near a house using the map information and the captured images.

The alert control part 202 may perform control so that the output part 204 can output an emergency alert during travel or stoppage. Thus, for example, in addition to the traveling vehicle, for example, a vehicle under charging may notify an emergency alert instead of a speaker.

Alert Notification Process

Next, the operation of alert notification performed by the small vehicle according to the present embodiment will be described. FIG. 8 is a flowchart showing an example of the process performed by the small vehicle according to the present embodiment. In the example shown in FIG. 8, in step S102, the receiving part 200 receives an emergency signal transmitted from another device.

In step S104, the alert control part 202 acquires current position information from the GPS sensor 120.

In step S106, the alert control part 202 acquires map information of surroundings from a map application (not shown) or a navigation device.

In step S108, the alert control part 202 determines a speech speed of an emergency alert based on the current position of the small vehicle, the map information of the surroundings, and the like. For example, the alert control part 202 determines the speech speed to be the second speech speed when it is determined to notify the emergency alert in a wide area, and determines the speech speed to be the first speech speed faster than the second speech speed when it is determined to notify the emergency alert in a narrow area.

In step S110, the alert control part 202 determines the content of the emergency alert based on the current position of the small vehicle and the map information of surroundings. For example, when the current position indicates a mountainous area, the alert control part 202 determines the content of the emergency alert to be the first alert for notifying a danger of as a landslide or the like. When the current position indicates a coastal area, the alert control part 202 determines the content of the emergency alert to be the second alert for notifying a danger of a tsunami or the like.

In step S112, the output part 204 outputs an emergency alert based on the speech speed and the content of the emergency alert thus determined.

Thus, when receiving an emergency signal, the small vehicle according to the present embodiment can control a speech speed and can output an emergency alert. Furthermore, in the above example, the content of the emergency alert is changed depending on whether the current position is in a mountainous area or a coastal area. Alternatively, the content of the emergency alert may be transmitted from another device.

Specific Examples

Next, specific examples of the speech speed and the alert content according to the present embodiment will be described with reference to FIGS. 9 to 11. FIG. 9 is a view for illustrating specific example 1 according to the present embodiment. In the example shown in FIG. 9, a vehicle 100A is traveling on a road near a coastal area, and a house is present near the vehicle 100A. A vehicle 100B is traveling along the coastal area, but no house is present near the vehicle 100B. A vehicle 100C is traveling in a mountainous area, and no house is present near the vehicle 100C.

In the case of specific example 1, the alert control part 202 of the vehicle 100A determines that the current position is a coastal area and a house is present near the vehicle 100A, based on the current position and the map information of surroundings. Therefore, the alert control part 202 outputs a water-related danger such as a tsunami or the like at the first speech speed.

The alert control part 202 of the vehicle 100B determines that the current position is a coastal area and no house is present near the vehicle 100B, based on the current position and the map information of surroundings. Therefore, the alert control part 202 outputs a water-related danger such as a tsunami or the like at the second speech speed (slower than the first speech speed).

The alert control part 202 of the vehicle 100C determines that the current position is a mountainous area and no house is present near the vehicle 100B, based on the current position and the map information of surroundings. Therefore, the alert control part 202 outputs a mountain-related danger such as a landslide or the like at the second speech speed (slower than the first speech speed).

FIG. 10 is a view for illustrating specific example 2 according to the present embodiment. In the example shown in FIG. 10, the alert control part 202 of each vehicle performs information communication with other vehicles via the communication device 110. For example, each vehicle can communicate by predetermined wireless communication (Wi-Fi (registered trademark)) or the like. Each vehicle determines an area for notification of an emergency alert from its current position or the like. A disaster area can be covered by combining all the notification areas of the respective vehicles.

For example, a vehicle 100A notifies an emergency alert when traveling in an area AR1, a vehicle 100B notifies an emergency alert when traveling in an area AR2, and a vehicle 100C notifies an emergency alert when traveling in an area AR3. In addition, each vehicle may notify a rider of an area in charge via a display device or the like. This makes it possible to notify the same emergency alert in a predetermined area, prevent frequent changes in the content and the speech speed of the emergency alert, and efficiently notify the emergency alert.

FIG. 11 is a view for illustrating specific example 3 according to the present embodiment. In the example shown in FIG. 11, it is assumed that the vehicle (personal mobility) 100C has the function of the operation control part 206 capable of making autonomous travel. At this time, the operation control part 206 of the vehicle 100C specifies a village in a sparsely populated area based on the map information and makes autonomous travel to the village. The output part 204 may output an emergency alert when arriving at the village. As a result, even if a person lives in an area to which a town broadcast or the like cannot reach, the vehicle 100C can move to the vicinity of the village and can notify an emergency newsflash.

In addition, when the vehicle 100C is a personal mobility, even if there is no road, the vehicle can move closer to a house using the map information and the images captured by the imaging device 170, as long as there is a space through which the vehicle 100C can pass (see FIG. 11). The presence or absence of a space through which the vehicle 100C can pass may be determined by detecting, through image recognition, an obstacle or the like in the images captured by the imaging device 170.

MODIFICATIONS

Moreover, in the modifications of the embodiment described above, the respective processes described in the embodiment may be combined with each other, or any process may not be implemented. For example, it is possible for the vehicle to implement a speech speed control process and not implement an alert content changing process, and vice versa. Although the small vehicle has been described above by way of example, the disclosure may be applied to a two-wheel vehicle or a four-wheel vehicle. In addition, a part of the processes of the vehicle may be performed on the server side.

What is claimed is:

1. A vehicle comprising:
   a receiving part configured to receive an emergency signal;
   an alert control part configured to determine a speech speed of an emergency alert based on a positional relationship between (i) a current position indicated by current position information of the vehicle and (ii) a residential area indicated by map information of surroundings of the vehicle when the emergency signal is received by the receiving part; and
   an output part configured to output the emergency alert using the speech speed determined by the alert control part.

2. The vehicle according to claim 1, wherein the alert control part is configured to determine the speech speed to be a first speech speed when the current position is spaced apart by a distance smaller than a predetermined distance from the residential area, and determine the speech speed to be a second speech speed that is slower than the first speech speed when the current position is spaced apart by a distance equal to or larger than the predetermined distance from the residential area.

3. The vehicle according to claim 1, wherein the alert control part is configured to change a content of the emergency alert based on the current position and a position of a mountainous area or a coastal area indicated by the map information.

4. The vehicle according to claim 1, further comprising an imaging device,
   wherein the alert control part is configured to change the speech speed of the emergency alert based on the number of persons imaged by the imaging device.

5. The vehicle according to claim 1, further comprising a communication part configured to communicate with other vehicles,
   wherein the alert control part is configured to determine a notification area of the emergency alert of each of the vehicles by performing information communication with the other vehicles.

6. The vehicle according to claim 1, further comprising an operation control part configured to enable autonomous traveling, wherein:
   the operation control part is configured to specify a village in a sparsely populated area based on the map information and autonomously travel to the village; and
   the output part is configured to output the emergency alert when the vehicle arrives at the village.

7. The vehicle according to claim 1, wherein the alert control part is configured to control the output part to output the emergency alert during travel or stoppage.

8. A vehicle control method comprising:
   receiving an emergency signal;
   determining a speech speed of an emergency alert based on a positional relationship between (i) a current position indicated by current position information of a vehicle and (ii) a residential area indicated by map information of surroundings of the vehicle when the emergency signal is received; and
   outputting the emergency alert using the speech speed.

9. A non-transitory computer-readable recording medium storing a program executed by a vehicle, wherein the program causes the vehicle to execute:
   receiving an emergency signal;
   determining a speech speed of an emergency alert based on a positional relationship between (i) a current position indicated by current position information of the vehicle and (ii) a residential area indicated by map information of surroundings of the vehicle when the emergency signal is received; and
   outputting the emergency alert using the speech speed.

* * * * *